United States Patent
Park et al.

[11] Patent Number: 6,160,875
[45] Date of Patent: Dec. 12, 2000

[54] METHOD OF MANAGING OVERLOAD OF MESSAGE IN THE COMMUNICATION SYSTEM

[75] Inventors: Hyoung Sun Park, Seoul; Hak Jae Shin, Kyunggi-do, both of Rep. of Korea

[73] Assignee: LG Information & Communications, Ltd., Seoul, Rep. of Korea

[21] Appl. No.: 09/152,105

[22] Filed: Sep. 14, 1998

[30] Foreign Application Priority Data

Dec. 30, 1997 [KR] Rep. of Korea ............ 97-79177
Dec. 30, 1997 [KR] Rep. of Korea ............ 97-79178

[51] Int. Cl.$^7$ ........................... H04M 15/00
[52] U.S. Cl. ........... 379/133; 379/111; 379/133; 379/265; 379/266; 379/309
[58] Field of Search ............... 379/113, 133, 379/134, 221, 230, 265, 266, 207, 309, 111, 112

[56] References Cited

U.S. PATENT DOCUMENTS

| | | | |
|---|---|---|---|
| 4,511,762 | 4/1985 | Stockdale | 179/9 |
| 4,809,318 | 2/1989 | Schoute | 379/279 |
| 4,974,256 | 11/1990 | Cyr et al. | 379/113 |
| 5,067,074 | 11/1991 | Farel et al. | 395/200 |
| 5,097,499 | 3/1992 | Cosentino | 379/59 |
| 5,164,983 | 11/1992 | Brown et al. | 379/265 |
| 5,450,483 | 9/1995 | Williams | 379/279 |
| 5,521,971 | 5/1996 | Key et al. | 379/220 |
| 5,548,533 | 8/1996 | Gao et al. | 455/9 |
| 5,574,770 | 11/1996 | Yoo et al. | 379/34 |
| 5,621,305 | 4/1997 | Clark et al. | 323/210 |
| 5,778,057 | 7/1998 | Atai | 379/220 |
| 5,787,153 | 7/1998 | Bankay et al. | 379/88 |
| 5,835,490 | 11/1998 | Park et al. | 370/342 |
| 5,867,787 | 2/1999 | Vudali et al. | 455/445 |
| 5,878,224 | 3/1999 | Smith | 395/200 |
| 5,892,818 | 4/1999 | Lee | 379/112 |

Primary Examiner—Duc Nguyen
Assistant Examiner—Quoc D. Tran
Attorney, Agent, or Firm—Fleshner & Kim, LLP

[57] ABSTRACT

A method of managing overload of messages in communication systems comprising: classifying application processes according to use/non-use of messages and scales and types of overload and constructing a database based upon a result of classification; periodically checking message queues of said application processes to identify states of the message queues; and when the state of one of said message queues is an advanced overload state, analyzing a scale and type of relevant overload using said database and processing the overload analyzed.

20 Claims, 7 Drawing Sheets

| Type | Number | Over_Load1 | Over_Load2 | Level | Description |

METHOD OF MANAGING OVERLOAD OF MESSAGE IN THE COMMUNICATION SYSTEM

FIELD OF THE INVENTION

The present invention relates to communication systems, and more particularly to a method of managing overload of messages for detecting and clearing the overload in communication systems based on messages.

BACKGROUND OF THE INVENTION

Generally, in a home location register (HLR) of a mobile communication system, each process includes an application service element (ASE) for processing protocol relevant messages and other messages, a process management block (PRMB) for performing periodical process' health check, queue check, and lock file check with respect to the ASE, and an operation & maintenance subsystem (OMS) for managing the PRMB.

The PRMB largely comprises a health check algorithm, a queue check algorithm, an overload algorithm, and a process state management algorithm. The PRMB checks existence and validity of a process related to the relevant mobile communication system during initialization before performing the algorithms.

Subsequently, the health checks, the queue check, the lock file check, the process by the OMS, and other processes for the messages are recurrently performed.

The health check algorithm checks health of each ASE included by the system and processes faults, if the faults are happened. The PRMB checks the health while transmitting and receiving messages to and from each ASE or through file locking.

The overload algorithm checks whether or not queues in each process are overloaded. The overload designates that the amount of messages lead into the queue of a process exceeds 65,535 bytes and messages stored in the entire process amount to over 120,000 bytes or the number of the message amounts to over 24,000.

A method of controlling the overload uses use time of the process as a reference of the overload, which is disclosed in the U.S. Pat. No. 4,974,256 entitled "Load Balancing and Overload Control in a Distributed Processing Telecommunications System". This method is to periodically measure real time occupancy of each processor and allocate new calls in such a way as to attempt to make each processor's occupancy approach the average occupancy of all the processors. When the average occupancy of the processors in one period exceeds a predetermined value, this is detected as overload. If the overload happens, new calls are shed to make the average occupancy not exceed the predetermined value.

Another method of controlling the overload, which is disclosed in the U.S. Pat. No. 4,809,318, is to detect the overload based upon the number of connected calls and the number of calls which are waiting to be handled by a process and to reject new requests under the overload.

Further another method of controlling the overload, which is disclosed in the U.S. Pat. No. 4,511,762, is to detect the overload based upon the time for a process to transmit a message to a line and trunk and receive a response message.

However, conventional technology of controlling the overload is developed with a focus on hardware of an exchange, so it has problems in detecting and controlling the overload occurring in a communication system with basis of a common computer. The overload can be caused by various factors, such as an amount of entire messages and converge of messages into a particular process in the communication system. In this regard, the conventional technology is lacking in precisely detecting the overload occurring in the overall system.

SUMMARY OF THE INVENTION

Accordingly, the present invention is directed to a method of managing overload of messages in communication systems that substantially obviates one or more of the limitations and disadvantages of the related art.

An objective of the present invention is to provide a message overload managing method for immediately detecting message overload as soon as it occurs and obtaining detailed information on the overload by employing diversified management ways according to characteristics of application processes in communication systems.

Additional features and advantages of the invention will be set forth in the description that follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a method of managing overload of messages in communication systems, includes the steps of:

classifying application processes according to use/non-use of messages and scales and types of overload and constructing a database based upon a result of classification; periodically checking message queues of said application processes to identify states of the message queues; and when the state of one of said message queues is an advanced overload state, analyzing a scale and type of relevant overload using said database and processing the overload analyzed.

The classifying step comprises the step of classifying the application processes into a message using process and a message non-using process according to the use/non-use of messages and into an overall overload related process and a local overload related process according to the scales and types of the overload. The message using process includes a database management system (DBMS) related process, a system related process, and an interface related process. The overall overload related process includes a DBMS related process and a system related process. The local overload related process includes a location/service authority related process, a call process related process, an additional service related process, and an interface-related process.

The checking step comprises:

the first step of determining that the amount of messages in the message queue does not exceed a predetermined permitted limit value at periodic message queue check time and maintaining the message queue state at a normal state;

the second step of determining that the amount of the messages in the message queue exceeds the predetermined permitted limit value at the periodic message queue check time, changing the message queue state into the advanced overload state, requesting analysis and process of the overload, and initializing overload clearing time;

the third step of determining that the amount of the messages exceeds the permitted limit value at the message queue check time at the advanced overload state and maintaining the message queue state at the advanced overload state until the overload is cleared;

the fourth step of determining that the amount of messages does not exceed the permitted limit value at the message queue check time at the advanced overload state and changing the message queue state into an overload cleared state, then counting the overload clearing time;

the fifth step of determining that the counted overload clearing time exceeds predetermined clearing completion time at the overload cleared state and changing the message queue state into the normal state; and the sixth step of determining that the counted overload clearing time does not exceed the predetermined clearing completion time at the overload cleared state and that the amount of message exceeds the permitted limit value at the periodic message queue check time and changing the message queue state into the advanced overload state.

At the first step, when it is determined that the amount of the messages exceeds the permitted limit value at the periodic message queue check time, the message queue state is changed into the initial overload state. Subsequently, if it is determined that the amount of the messages does not exceed the permitted limit value at the periodic message queue check time at the initial overload state, the message queue state is changed into the normal state. The initial overload state is the state where actual operations on the overload are not performed but only initial information on the overload is managed.

In one embodiment of the present invention, the step of determining that the amount of the messages exceeds the permitted limit value comprises the steps of:

determining that the application process, which will manage the overload, uses messages of various applications programs;

determining that it is time to check the message queue and checking the amount of messages which cannot be handled and is accumulated in the message queue; and determining that the checked amount of the messages exceeds the permitted limit value and requesting transition of the message queue state.

In another embodiment of the present invention, the step of determining that the amount of the messages exceeds the permitted limit value comprises the steps of:

determining that the application process, which will manage the overload, uses messages of various applications programs;

determining that it is time to check the message queue and generating and transmitting a health check message; and determining whether or not the health check message is successfully transmitted and requesting transition of the message queue state.

At the sixth step, when it is determined that the counted overload clearing time does not exceed the predetermined clearing completion time and that the amount of the messages does not exceed the permitted limit value at the periodic message queue check time, the overload cleared state is maintained and the overload clearing time is incremented.

The analyzing and processing step comprises the steps of:

identifying that the message queue state is the advanced overload state;

generating and transmitting a check message to the process having overload and collecting information on the overload;

analyzing the collected overload information based upon the database information to identify types of the overload by scales and functions;

generating an overload message based upon the analyzed information to an interlocked other system; and performing an its own overload processing algorithm according to the analyzed information to clear the overload.

The overload message comprises a type of the overload message, an identification number of the system having the overload, a type of the overload by scales, a type of the overload by functions, a level of the overload by the functions, and a description of the overload.

Alternatively, the analyzing and processing step further comprises the step where the interlocked other system in response to the overload message identifies a scale, type, and level of the overload and, subsequently, adjusts the amount of overall messages when in overall overload and adjusts the amount of relevant messages according to the type and level when in local overload.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

While conventional technology which uniformly processes overload occurring in a communication system has drawbacks of prolonging overload time and deteriorating performance of the system, the present invention which processes the overload properly according to a type of the overload minimizes faults caused by the overload in the system, thus increasing available time of the system.

To obtain information on the type of the overload and other related information, the present invention classifies application processes existing in the communication system into various types.

Figure 1:
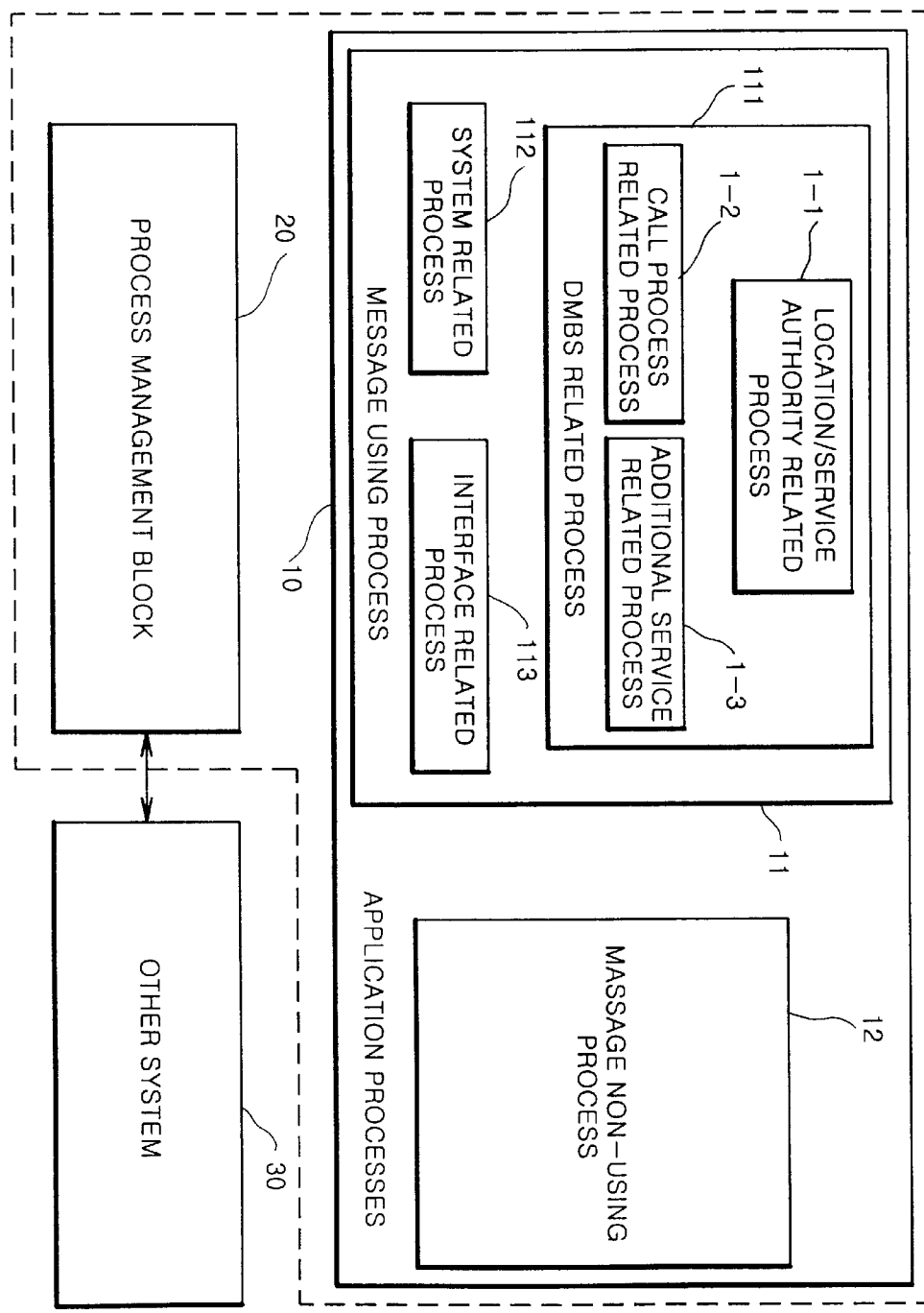
FIG. 1 is a block diagram showing how application processes are classified for management in a communication system according to an embodiment of the present invention.

As shown in FIG. 1, a configuration for management of the application processes in the communication system comprises application processes 10, a process management block 20, and an other system 30.

The application processes 10 is classified into a message using process 11 which uses various messages of the application programs and a message non-using process 12 which does not use these messages. The message using process 11 comprises a database management system (DBMS) related process 111, a system related process 112, and an interface related process 113. The DBMS related process 111 includes a location/service authority related process 1-1, a call process related process 1-2, and an additional service related process 1-3.

In a preferred embodiment of the present invention, the message using process 11 is divided according to scales and types of overload by functions into processes related to overall overload corresponding to faults related to the DBMS or system related faults and processes related to a local overload corresponding to faults occurring in a particular portion of the system, such as faults related to interface, faults related to location/service authority, faults related to call process, and faults related to additional services. The overall overload related processes include the DBMS related process 111 and the system related process 112, and the local overload related process includes the location/service authority related process 1-1, the call process related process 1-2, the additional service related process 1-3, and the interface related process 113, the processes through which a type of the overload can be recognized.

The process management block 20 manages the application processes 10. It detects the overload of the application processes 10 and interfaces with the other system 30 with respect to information.

The other system 30, which is interlocked with the process management block 20, transmits and receives the information to and from the process management block 20.

Figure 2:
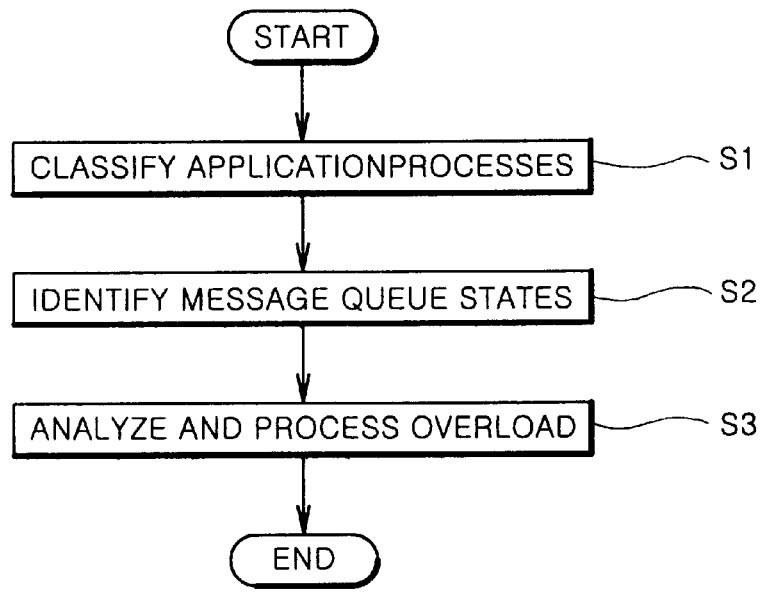
FIG. 2 is a flow chart of a message overload managing method in a communication system according to an embodiment of the present invention.

With reference to the flow chart depicted in FIG. 2, a message overload managing method in communication systems according to the embodiment of the present invention will now be simply described.

According to use/non-use of messages of various application programs in order to manage the overload to the application processes using the messages, and according to the scale and type of the overload in order to exactly identify variety of overload information, the application processes 10 are classified and a database is constructed based upon a result of the classification (S1).

Specifically, the application processes 10 are classified into the message using process 11 and the message non-using process 12 according to the use/non-use of the messages while the application processes 10 are classified into the overall overload related process and the local overload related process according to the scales and types of the overload.

The overall overload related process includes the DBMS related process 111 and the system related process 112. The local overload related process includes the location/service authority related process 1-1, the call process related process 1-2, the additional service related process 1-3, and the interface related process 113.

After finishing the first step S1, the amount of messages is repeatedly checked periodically with respect to each message queue of the application processes 10. The amount of the messages of a message queue is compared with a permitted limit value of the relevant message queue to identify a state of the message queue, that is, to identify the message state as a normal state without overload, an initial overload state where actual operations for the overload are not performed but only initial information on the overload is managed, an advanced overload state where actual overload processing operations are performed, or an overload cleared state where the normal state is restored because the overload is not detected for a predetermined consecutive time interval in the advanced overload state (S2).

When the message queue state is determined as the advanced overload state at the step S2, analysis and identifying of the overload is performed to process the overload. Specifically, the overload is analyzed to determine that it is related to the overall system and which type it belongs to using the database information generated at the step S1. As a result of the analysis, a message having the analyzed overload information is generated and transmitted to the interlocked other system 30. Simultaneously, algorithms are performed with respect to the overload within the system itself to clear the overload (S3).

Figure 3:
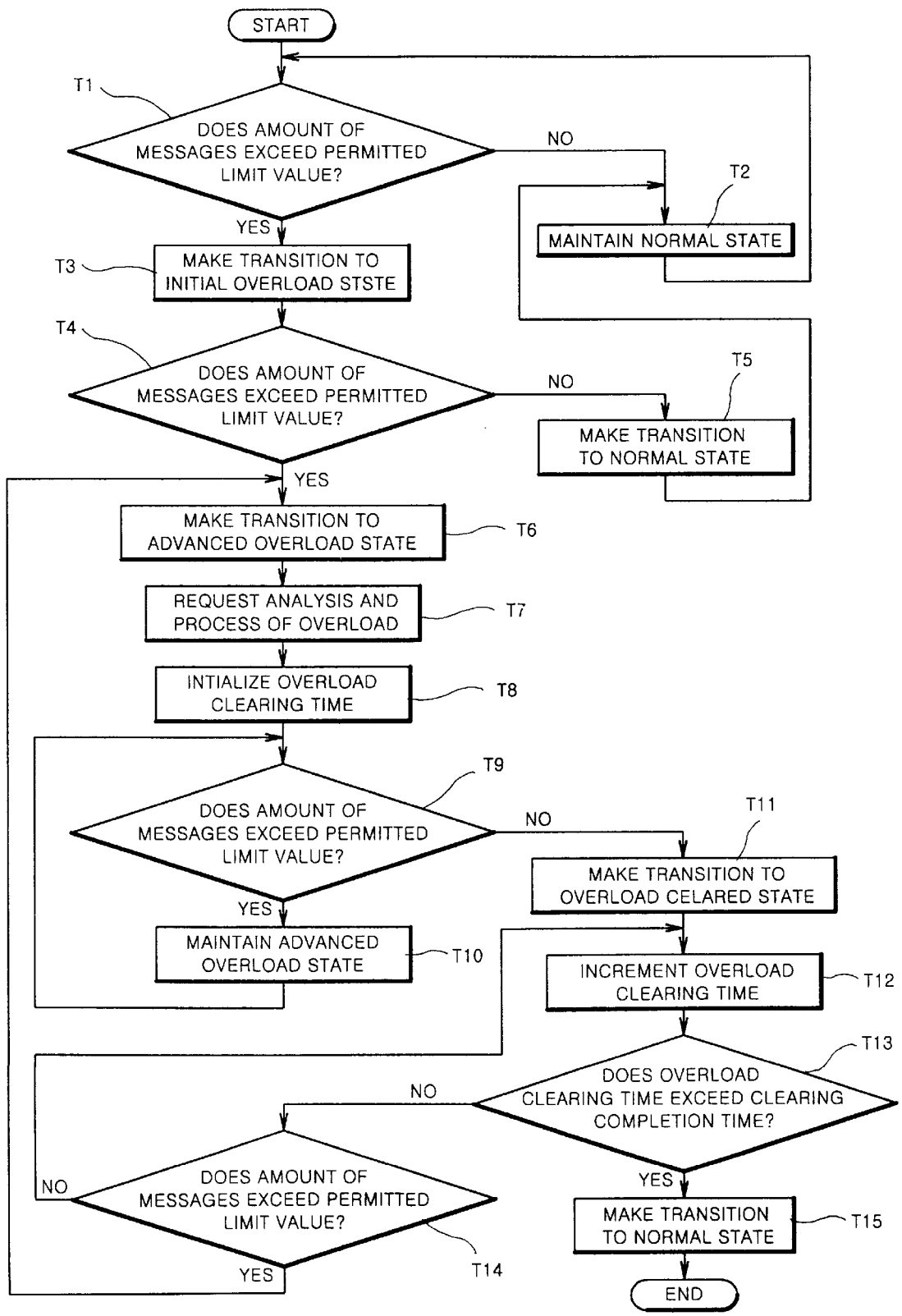
FIG. 3 is a flow chart showing how to check the state of a message queue depicted in FIG. 2.

With reference to FIG. 3, the step S2 in FIG. 2, for detection of the overload in the communication system, will now be described in detail.

The message queues of the application processes 10 are periodically checked to detect message overload. In other words, the amount of messages which cannot be handled and accumulated is checked with respect to each message queue at each periodic message queue check time to determine that the amount of the messages which a relevant application process cannot handle and which are waiting exceeds the relevant permitted limit value (T1).

If the amount of the messages is determined not to exceed the permitted limit value at the message queue check time at the step T1, the message queue state is maintained at the normal state (T2). If the amount of the messages is determined to exceed the permitted limit value at the message queue check time at the step T1, an initial overload flag is set to make the message queue state is changed into the initial overload state where actual operations for the overload are not performed but only initial information on the overload is managed (T3).

The amount of the messages is newly measured at periodic message queue check time at the initial overload state to determine that the amount of the messages exceeds the permitted limit value (T4). If the amount of the messages does not exceed the permitted limit value, an operation flag is set to a normal flag to make transition to the normal state and the normal state is maintained (T5). If the amount of the messages exceeds the permitted limit value, the operation flag is set to an advanced overload flag to make transition to the advanced overload state (T6).

As soon as the transition to the advanced overload state is made at the step T6, the analysis and process of the overload is requested and the step S3 in FIG. 2 is performed, that is, the procedure of analyzing and processing the overload proceeds (T7). Overload clearing time is initialized to "0" to count the overload clearing time taken to clear the overload of the relevant message queue from the beginning (T8).

The amount of the messages is newly measured at periodic message queue check time at the advanced overload state to determine that the amount of the messages exceeds the permitted limit value (T9). If the mount of the messages exceeds the permitted limit value, the advanced overload state is maintained to perform the procedure of analyzing and processing the overload until the overload is cleared (T10). If the amount of the messages does not exceed the permitted limit value, the operation flag is set to an cleared overload flag to make transition to the overload cleared state (T11). The overload clearing time is incremented at the overload cleared state (T12). Then the incremented overload clearing time is compared with a predetermined clearing completion time (T13). The predetermined clearing completion time indicates the time which is necessary for completely clearing the overload and which is established through measurement or calculation in advance.

If the incremented overload clearing time does not exceed the predetermined clearing completion time at the step T13, the amount of the messages is newly checked whether or not it exceeds the permitted limit value (T14). If the amount of the messages exceeds the permitted limit value, the procedure goes back to the step T6 to make transition to the advanced overload state. Alternatively, if the amount of the messages does not exceed the permitted limit value at the step T14, the overload clearing time is newly incremented at the step T12. When the incremented overload clearing time exceeds the predetermined clearing completion time at the step T13, that is, when the amount of the messages does not exceed the permitted limit value for a predetermined time period at the overload cleared state, the operation flag is set to the normal flag to make transition to the normal state (T15).

As illustrated, appropriate processes can be performed with respect to overload by exactly recognizing the state of the relevant message queue that irregularly changes.

Figure 4A:
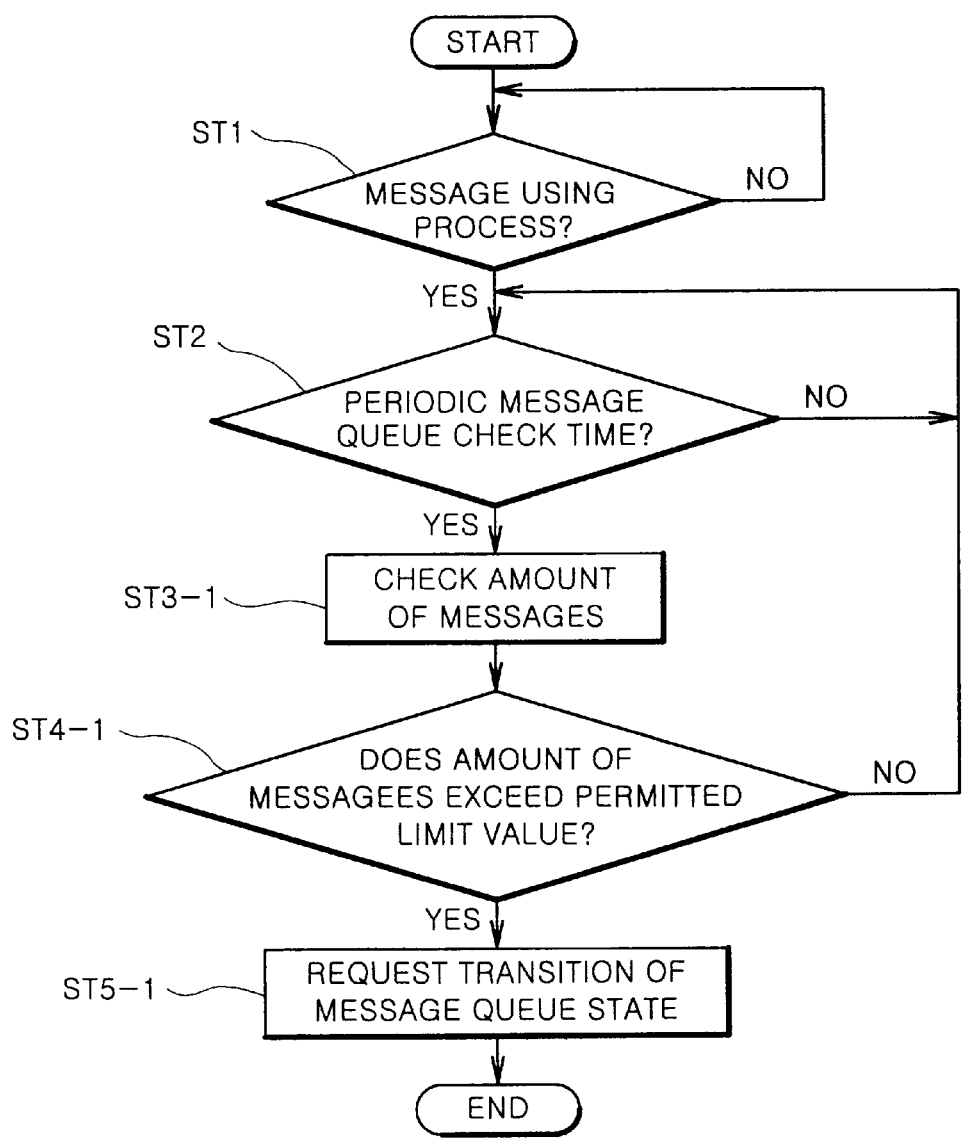
FIGS. 4a and 4b are flow charts showing in detail the step of detecting message overload depicted in FIG. 3.
Figure 4B:
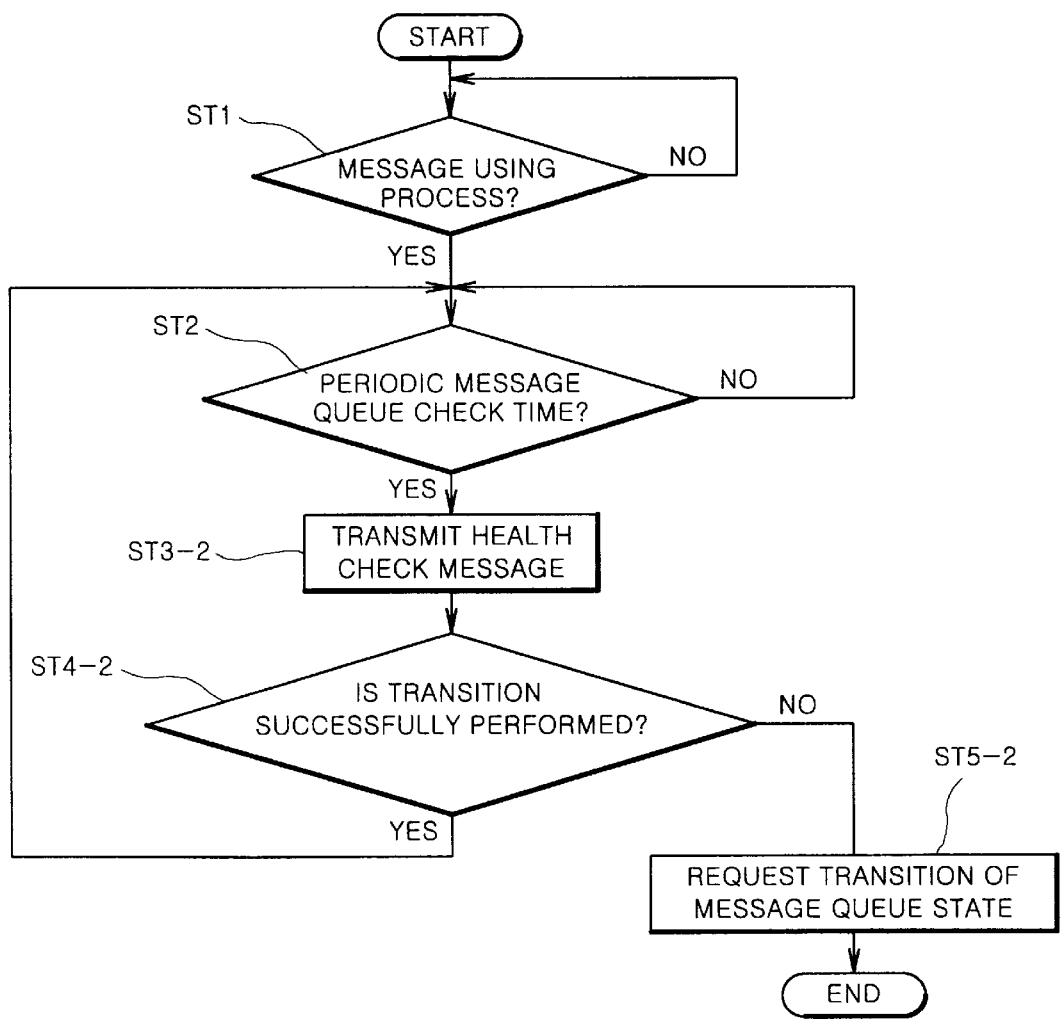

Here, the step of determining the overload of the message queue (T1, T4, T9, and T14) is performed in such a way as shown in the flow charts depicted in FIGS. 4a and 4b.

To manage the overload to application processes using messages, the application processes are checked to determine whether or not they use the message s of various application programs. In other words, the application process to be supposed to manage the overload is checked to determine whether it falls under the message using process 11 or under the message non-using process 12 (ST1).

If the application process taking charge of managing the overload is determined to fall under the message using process at the step ST1, the time point is determined whether it corresponds to the message queue check time at which the message queue of the process is periodically checked for management of the message queue (ST2).

In one embodiment of the present invention, the amount of the messages, which cannot are handled and are accumulated in the message queue is checked at the message queue check time (ST3-1). The checked amount of the messages is compared with the predetermined permitted limit value to determine whether or not the checked amount of the messages exceeds the permitted limit value (ST4-1). When the amount of the messages exceeds the permitted limit value, the transition of the message queue state is requested (the message queue state can be changed into the normal state, the initial overload state, the advanced overload state, or the overload cleared state) (ST5-1).

In another embodiment of the present invention, a health check message is generate at the message queue check time and transmitted to the message queue (ST3-2). Whether or not the health check message is successfully transmitted to the message queue is determined (ST4-2).

When the health check message fails to be transmitted, the overload to the communication system is determined and the transition of the message queue state is requested (ST5-2).

Figure 5:
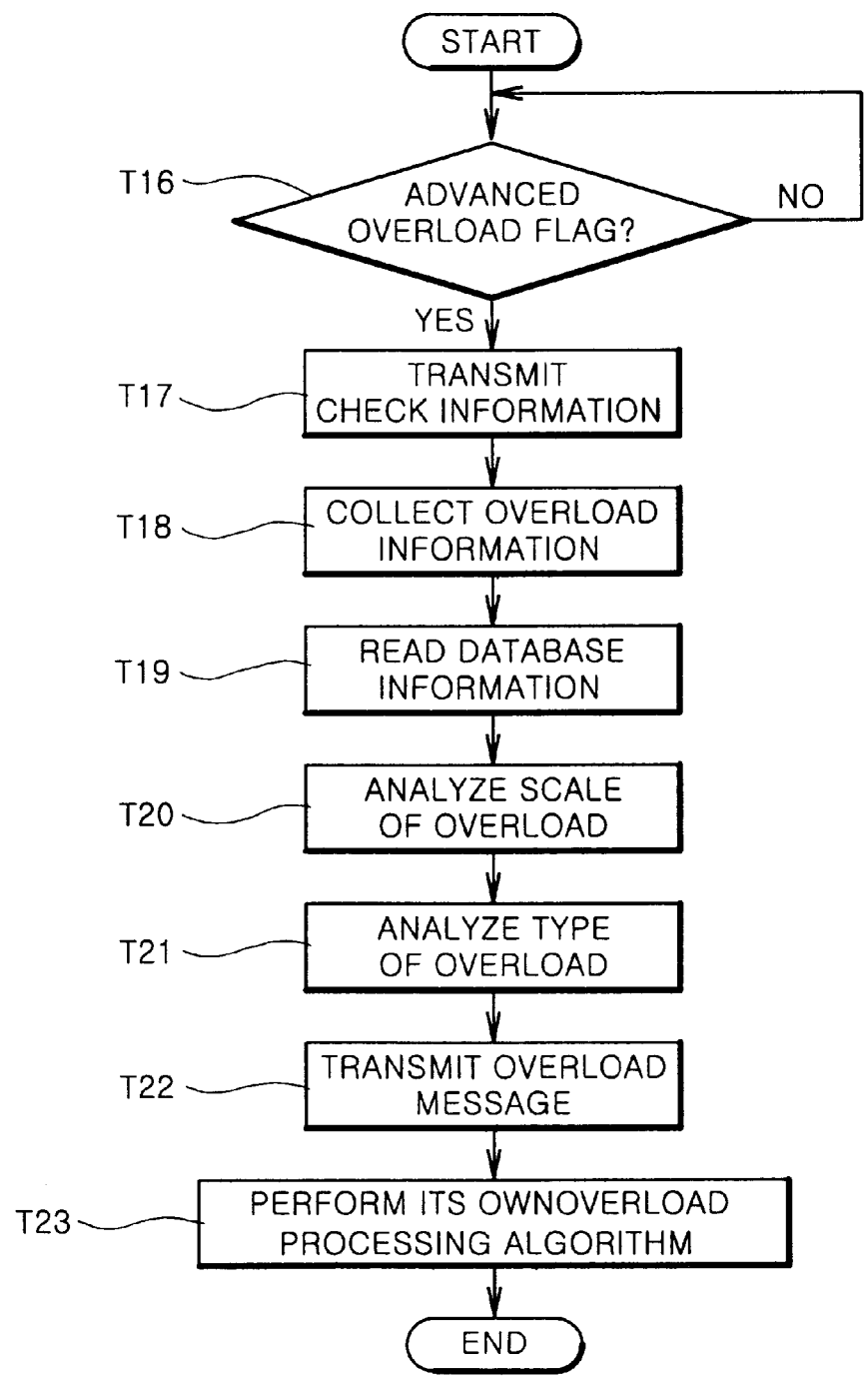
FIG. 5 is a flow chart showing in detail the step of analyzing and processing message overload depicted in FIG. 2.

The following description with reference to FIG. 5 concerns the step of analyzing and processing the overload to the communication system, the step being depicted in FIG. 2 as S3.

The set flag is checked to determine whether or not the flag is the advanced overload flag (T16).

If the flag is identified as the advance overload flag at the step T16, a check message is generated and transmitted to the message queue of the process where the overload is detected (T17). Information on the overload is collected from the check message transmitted (T18), and the database information created step S1 in FIG. 2 is read (T19).

The collected overload information is analyzed based upon the information read. First, the scale of the overload is analyzed, that is, whether the overload occurs in the process related to the overall overload or the process related to the local overload is determined (T20).

Subsequently, the type of the overload is analyzed by functions. In other words, it is determined that the overload occurs in the location/service authority related process 1-1, the call process related process 1-2, the additional service related process 1-3, the interface related process 113, or a system abnormality related process (not shown in the accompanying drawings) (T21).

Figures 6, 7:
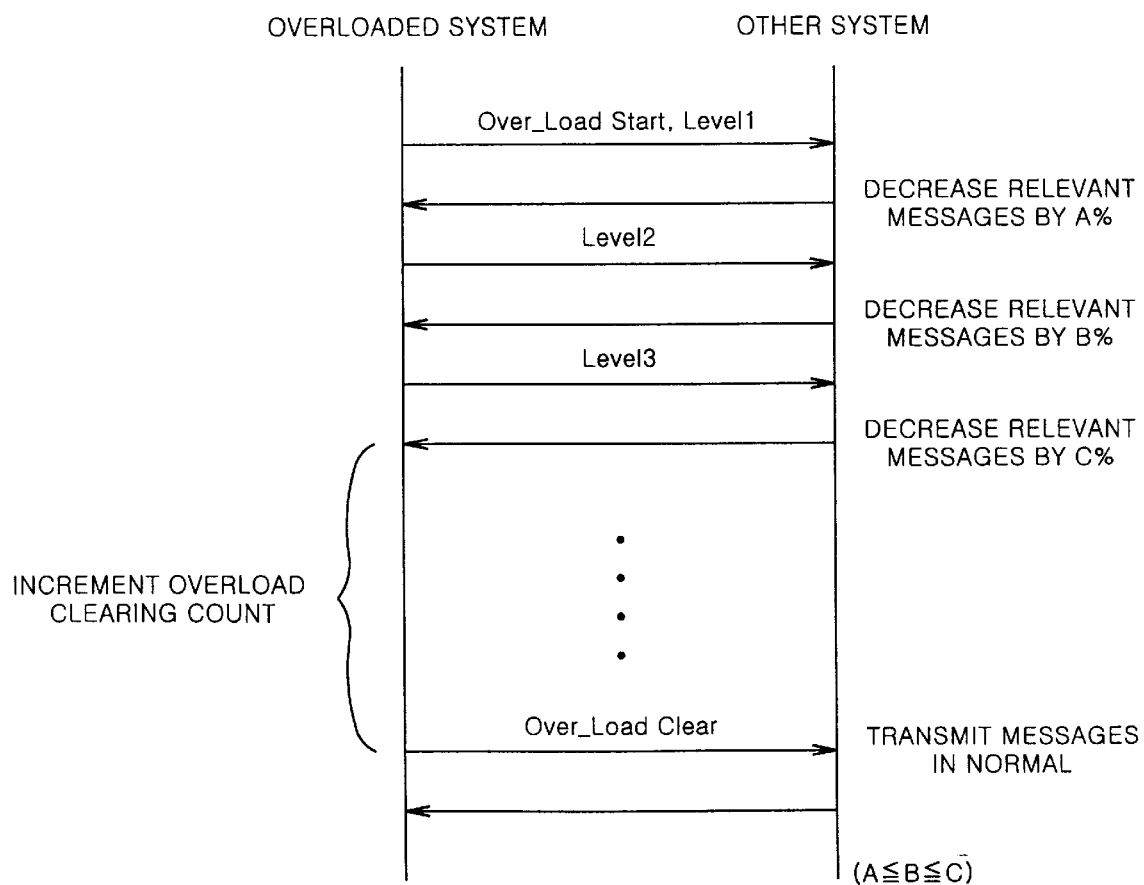
FIG. 6 illustrates a structure of an overload message depicted in FIG. 5.
FIG. 7 shows data flow for control of overload between an overloaded system and an other system linked thereto according to an embodiment of the present invention.

An overload message for notifying the interlocked other system 30 of the occurrence of the overload is generated based upon analyzed information through the steps T20 and T21 in such a way to have a message format as shown in FIG. 6 and transmitted to the other system 30 (T22). Here, the overload message comprises a "Type" for indicating a type of the overload message, a "Number" for indicating an identification number of the system, an "Over_Load1" for indicating a type of the overload by scales, an "Over_Load2" for indicating a type of the overload by functions, a "Level" for indicating a level of the overload by functions, and a "Description" for including a description on the overload.

When the overload message is transmitted to the other system 30, the other system 30 reads the overload message and performs different operations according to the scales, types, and levels of the overload. The operation of controlling the overload by the other system 30 can be easily understood with reference to FIG. 7. For example, if the overload is determined to be overall in view of the scale, an amount of overall messages is adjusted. If the overload is determined to be local and related to the call process, the other system 30 adjusts only the amount of call processing messages transmitted to the system in overload.

After finishing the step T22, an its own overload processing algorithm for processing overloads in the system itself is performed to clear the overload (T23).

As described above, the present invention can process overload caused by various factors in a communication system using the its own overload processing algorithm, detect the overload as soon as it occurs by way of periodically managing messages individually with respect to the application processes, and obtain information on the process having the overload in detail by way of analysis and classification.

Additionally, overload information constructed through the analysis and classification is transmitted to an other system to allow the other system to manage the overload together with the relevant system, thereby minimizing faults caused by the overload in the system and maximizing the available time of the system.

The application processes in the communication system can be changed in their internal programs. It will be apparent to those skilled in the art that various modifications and variations can be made in a method of managing overload of messages in communication systems of the present invention without deviating from the spirit or scope of the invention. Thus, it is intended that the present invention covers the modifications and variations of this invention provided they come within the scope of the appended claims and their equivalents.

What is claimed is:

1. A method of managing overload of messages in communication systems, the method comprising the steps of:

classifying application processes according to use/non-use of messages and scales and types of overload and constructing a database based upon a result of classification;

periodically checking message queues of said application processes to identify states of the message queues; and when the state of one of said message queues is an advanced overload state, analyzing a scale and type of relevant overload using said database and processing the overload analyzed.

2. A method according to claim 1, wherein said classifying step comprises the step of classifying said application processes into a message using process and a message non-using process according to the use/non-use of messages and into an overall overload related process and a local overload related process according to the scales and types of the overload.

3. A method according to claim 2, wherein said message using process includes a database management system (DBMS) related process, a system related process, and an interface related process.

4. A method according to claim 2, wherein said overall overload related process includes a DBMS related process and a system-related process.

5. A method according to claim 2, wherein said local overload related process includes a location/service authority related process, a call process related process, an additional service related process, and an interface-related process.

6. A method according to claim 1, wherein said checking step comprises:

the first step of determining that the amount of messages in said message queue does not exceed a predetermined permitted limit value at periodic message queue check time and maintaining the message queue state at a normal state;

the second step of determining that the amount of the messages in said message queue exceeds the predetermined permitted limit value at the periodic message queue check time, changing said message queue state into the advanced overload state, requesting analysis and process of the overload, and initializing overload clearing time;

the third step of determining that the amount of the messages exceeds the permitted limit value at the message queue check time at said advanced overload state and maintaining said message queue state at said advanced overload state until the overload is cleared;

the fourth step of determining that the amount of messages does not exceed the permitted limit value at the message queue check time at said advanced overload state and changing said message queue state into an overload cleared state, then counting said overload clearing time;

the fifth step of determining that said counted overload clearing time exceeds predetermined clearing completion time at said overload cleared state and changing said message queue state into the normal state; and the sixth step of determining that said counted overload clearing time does not exceed the predetermined clearing completion time at said overload cleared state and that said amount of message exceeds the permitted limit value at said periodic message queue check time and changing said message queue state into said advanced overload state.

7. A method according to claim 6, at said first step, further comprising the steps of:

determining said amount of the messages exceeds the permitted limit value at said periodic message queue check time and changing said message queue state into the initial overload state; and determining the amount of the messages does not exceed the permitted limit value at the periodic message queue check time at said initial overload state and changing said message queue state into the normal state.

8. A method according to claim 7, wherein said initial overload state is the state where actual operations on the overload are not performed but only initial information on the overload is managed.

9. A method according to claim 6, wherein said step of determining that said amount of the messages exceeds said permitted limit value comprises the steps of:

determining that the application process, which will manage the overload, uses messages of various applications programs;

determining that it is time to check said message queue and checking the amount of messages which cannot be handled and is accumulated in said message queue; and determining that the checked amount of the messages exceeds said permitted limit value and requesting transition of said message queue state.

10. A method according to claim 6, wherein said step of determining that said amount of the messages exceeds said permitted limit value comprises the steps of:

determining that the application process, which will manage the overload, uses messages of various applications programs;

determining that it is time to check said message queue and generating and transmitting a health check message; and determining whether or not said health check message is successfully transmitted and requesting transition of said message queue state.

11. A method according to claim 6, at said sixth step, further comprising the step of determining that said counted overload clearing time does not exceed the predetermined clearing completion time and that said amount of the messages does not exceed the permitted limit value at said periodic message queue check time and, subsequently, maintaining said overload cleared state and incrementing said overload clearing time.

12. A method according to claim 1, wherein said analyzing and processing step comprises the steps of:

identifying that said message queue state is the advanced overload state;

generating and transmitting a check message to the process having overload and collecting information on the overload;

analyzing the collected overload information based upon said database information to identify types of the overload by scales and functions;

generating an overload message based upon the analyzed information to an interlocked other system; and performing its own overload processing algorithm according to said analyzed information to clear the overload.

13. A method according to claim 12, wherein said overload message comprises a type of said overload message, an identification number of the system having the overload, a type of the overload by scales, a type of the overload by functions, a level of the overload by the functions, and a description of the overload.

14. A method according to claim 12, further comprising the step where said interlocked other system in response to said overload message identifies a scale, type, and level of the overload and, subsequently, adjusts the amount of overall messages when in overall overload and adjusts the amount of relevant messages according to the type and level when in local overload.

15. A method of managing overload of messages in communication systems, comprising the steps of:

classifying application processes into a message using process and a message non-using process according to use/non-use of messages, and into an overall overload related process and a local overload related process according to scales and types of the overload and constructing a database based upon a result of classification;

periodically checking message queues of the application processes to identify states of the message queues;

analyzing the scale and type of a relevant overload using the database, and processing the analyzed overload when the state of one of the message queues is an advanced overload state; and making an interlocked other system in response to the overload message to identify the scale, type, and a level of the overload and, subsequently, to adjust the amount of overall messages when in overall overload and adjusts the amount of relevant messages according to the type and level when in local overload, wherein said message using process in said classifying step includes a database management system (DBMS) related process, a system related process, and an interface related process, and said overall overload related process in said classifying step includes a DBMS related process and a system-related process, and said local overload related process in said classifying step includes a location/service authority related process, a call process related process, and additional service related process, and an interface-related process, and wherein said analyzing and processing step comprises the step of identifying that said message queue state is the advanced overload state, generating and transmitting a check message to the process having overload and collecting information on the overload, analyzing the collected overload information based upon said database information to identify types of the overload by scales and functions, generating an overload message based upon the analyzed information to an interlocked other system, said overload message comprising a type of said overload message, an identification number of the system having the overload, a type of the overload by scales, a type of the overload by functions a level of the overload by the functions, and a description of the overload, and performing its own overload processing algorithm according to said analyzed information to clear the overload.

16. The method according to claim 15, wherein said checking step comprises the further steps of:

determining that the amount of messages in said message queue does not exceed a predetermined permitted limit value at periodic message queue check time and maintaining the message queue state at a normal state;

determining that the amount of the messages in said message queue exceeds the predetermined permitted limit value at the periodic message queue check time, changing said message queue state into the advanced overload state, requesting analysis and process of the overload, and initializing overload clearing time;

determining that the amount of the messages exceeds the permitted limit value at the message queue check time at said advanced overload state and maintaining said message queue state at said advanced overload state until the overload is cleared;

determining that the amount of messages does not exceed the permitted limit value at the message queue check time at said advanced overload state and changing said message queue state into an overload cleared state, then counting said overload clearing time;

determining that said counted overload clearing time exceeds a predetermined clearing completion time at said overload cleared state and changing said message queue state into the normal state; and determining that said counted overload clearing time does not exceed the predetermined clearing completion time at said overload cleared state and that said amount of message exceeds the permitted limit value at said periodic message queue check time and changing said message queue state into said advanced overload state.

17. The method according to claim 16, further comprising the steps of:

determining said amount of the messages exceeds the permitted limit value at said periodic message queue check time and changing said message queue state into the initial overload state; and determining the amount of the messages does not exceed the permitted limit value at the periodic message queue check time at said initial overload state and changing said message queue state into the normal state.

18. The method according to claim 16, wherein said step of determining that said amount of the messages exceeds said permitted limit value comprises the steps of:

determining that the application process, which will manage the overload, uses messages of various applications programs;

determining that it is time to check said message queue and checking the amount of messages which cannot be handled and is accumulated in said message queue; and determining that the checked amount of the messages exceeds said permitted limit value and requesting transition of said message queue state.

19. The method according to claim 16, wherein said step of determining that said amount of the messages exceeds said permitted limit value comprises the steps of:

determining that the application process, which will manage the overload, uses messages of various applications programs;

determining that it is time to check said message queue and generating and transmitting a health check message; and determining whether or not said health check message is successfully transmitted and requesting transition of said message queue state.

20. The method according to claim 15, wherein said overload messages comprises a type of said overload message, an identification number of the system having the overload, a type of the overload by scales, a type of the overload by functions, a level of the overload by the functions, and a description of the overload.

* * * * *